T. D. STANLEY.
STEERING WHEEL LOCK.
APPLICATION FILED JULY 11, 1918.
1,300,505.
Patented Apr. 15, 1919.
2 SHEETS—SHEET 1.
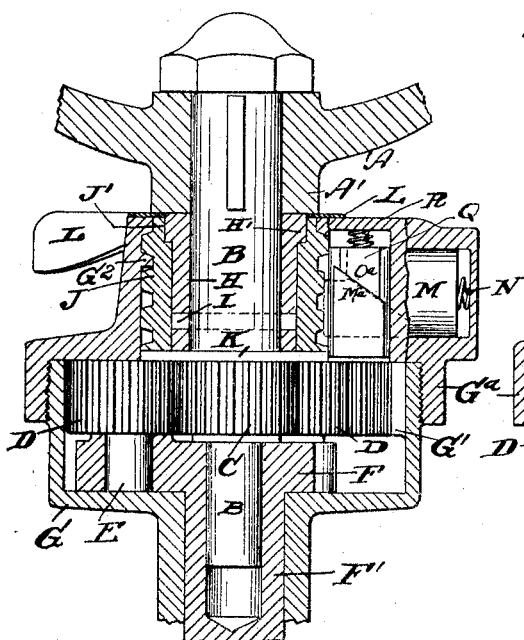
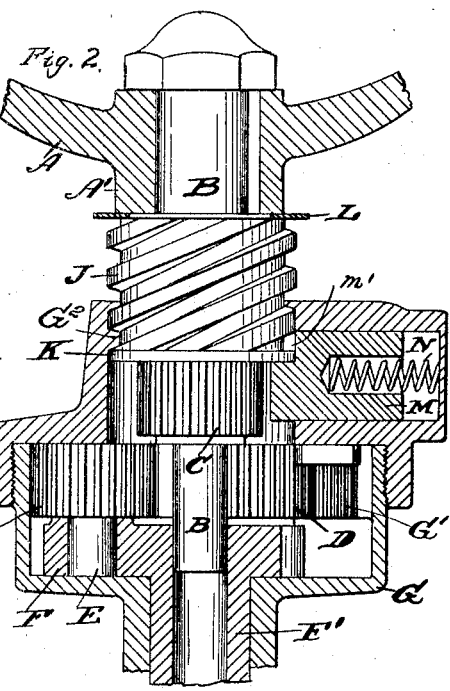
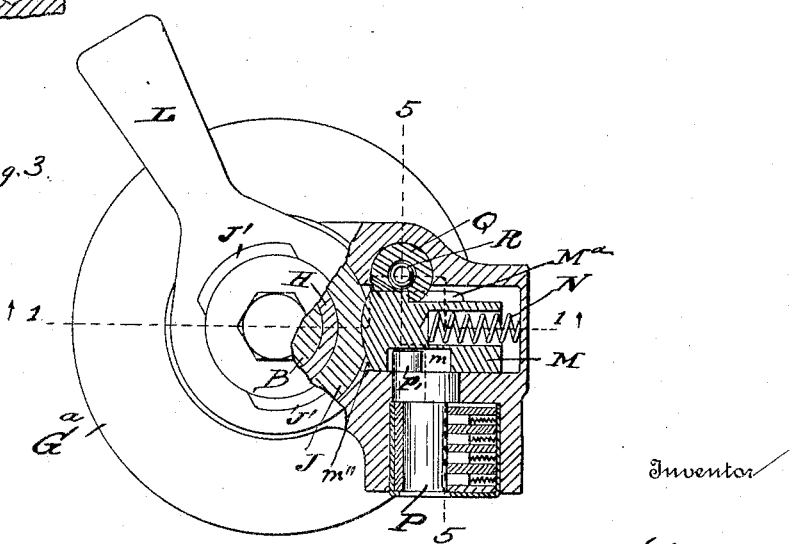
Inventor
Theodore D. Stanley
By S. S. Thomas
Attorney

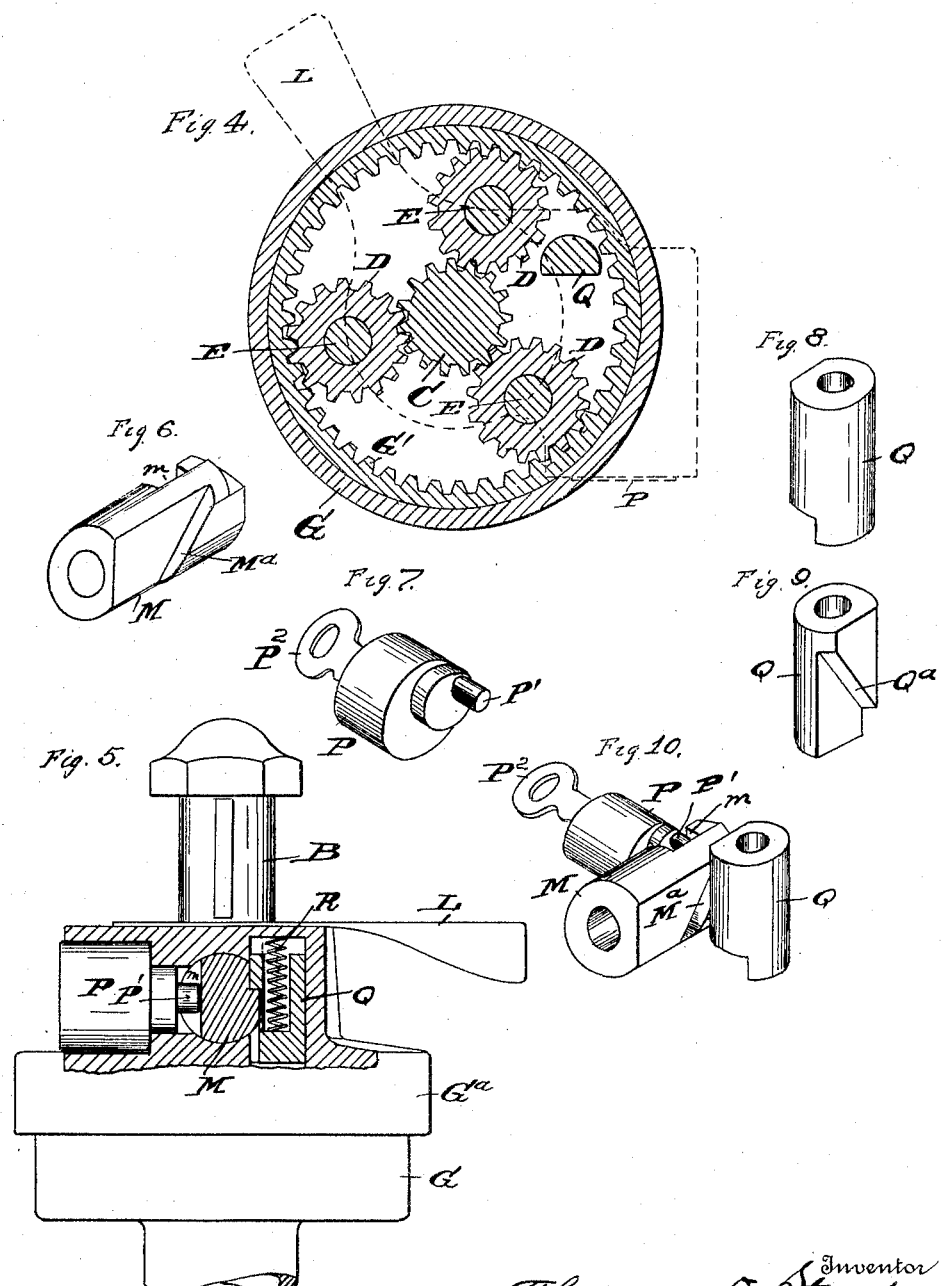

UNITED STATES PATENT OFFICE.

THEODORE D. STANLEY, OF DETROIT, MICHIGAN, ASSIGNOR TO LELAND LOCK COMPANY, OF DETROIT, MICHIGAN, A CORPORATION OF MICHIGAN.

STEERING-WHEEL LOCK.

1,300,505. Specification of Letters Patent. Patented Apr. 15, 1919.

Application filed July 11, 1918. Serial No. 244,345.

*To all whom it may concern:*

Be it known that I, THEODORE D. STANLEY, citizen of the United States, residing at Detroit, county of Wayne, State of Michigan, have invented a certain new and useful Improvement in Steering-Wheel Locks, and declare the following to be a full, clear, and exact description of the same, such as will enable others skilled in the art to which it pertains to make and use the same, reference being had to the accompanying drawings, which form a part of this specification.

My invention relates to a steering wheel lock, for motor driven vehicles, shown in the accompanying drawings and more particularly pointed out in the following specification and claims.

This invention is especially designed for use in connection with the steering gear employed on the so-called "Ford" automobiles in which a stub shaft supporting the steering wheel and carrying a pinion, is operably connected with the steering post through a system of planetary gearing inclosed within a case located directly beneath the steering wheel.

One object of the present invention is to render the steering wheel inoperative for actuating the steering post by providing manually operable means adapted to raise the steering wheel and thereby lift the pinion carried by its stub shaft out of mesh with the planetary gearing coöperating with the pinion in the control of the steering post:—Manually operated means being employed to maintain the steering wheel in an inoperative relation to the steering post, said means being also adapted to secure the steering wheel against accidental release when the wheel is operably connected with the steering post.

Another feature of the invention consists in means which serves to secure the cover of the case inclosing the planetary gears against removal by maliciously inclined persons who may thus attempt to bring the steering wheel into operative relation with the steering post.

It will also be noted that the construction and operation of the present invention is such that when the wheel is rendered inoperative to actuate the steering post the wheel is free to rotate in either direction, thereby differentiating it from devices in which the wheel is rigidly locked against rotation.

With the foregoing and other objects in view which will appear as the description proceeds, the invention resides in the combination and arrangement of parts and in the details of construction hereinafter described and claimed, it being understood that changes may be made in precise embodiment of the invention herein disclosed without departing from the spirit of the same.

In the accompanying drawings forming part of this specification:—

Figure 1 is a vertical sectional view through a fragment of a steering wheel, the planetary gear case with parts therein, taken on line 1—1 of Fig. 3:—showing the steering wheel in operable connection with the steering post.

Fig. 2 is a similar view with the steering wheel raised as it would appear when released from the control of the steering post.

Fig. 3 is a plan view of the planetary gear case and manually operable lever for releasing the wheel,—showing parts broken away and in section to more clearly disclose the construction.

Fig. 4 is a horizontal sectional view through the planetary gear case.

Fig. 5 is an elevation of the device with parts in section taken on line 5—5 of Fig. 3.

Figs. 6, 7, 8, 9 and 10 are perspective views of details of construction.

Referring now to the letters of reference placed upon the drawings:

A, denotes the spider of a steering wheel and A' its hub keyed to a stub shaft B. C, indicates a gear or pinion carried by the stub shaft in mesh with three like gears D, carried upon studs E, secured to a plate F, at the top of the steering post F', into which the lower end of the stub shaft extends. G is a gear case having an internal spur gear G', on its inner periphery with which the gears D are in mesh. When the steering wheel is rotated it turns the center pinion or gear C, which causes the gears D attached to the steering column to rotate,—and in the same direction as the hand wheel—but at a slower speed. The foregoing is the usual "Ford" steering wheel assembly,—its construction and operation being well known and understood it requires no further explanation here.

The stub shaft B in the present construction is the same as that employed in the usual "Ford" assembly, and is adapted to receive a thimble H between the gear or pinion C and the hub of the steering wheel,—the thimble being secured to the stub shaft by a pin I extending transversely through the latter.

Loosely sleeved upon the thimble is an annular threaded bushing J, held against longitudinal movement or play by a projecting flange H', extending from the thimble into a recess J' formed in the upper end of the threaded bushing,—and an annular washer K,—mounted on the stub shaft between the end of the thimble H and the upper face of the gear C. G$^a$ indicates a cover plate screwed upon the case G having a hub portion formed with internal threads G$^2$, with which the threads of the bushing J engage. L, denotes a manually operated lever preferably constructed of sheet metal and slotted to receive the projecting lugs J' of the bushing J, whereby the latter may be rotated to raise or lower the gear C, into or out of mesh with the gears D. M denotes a bolt lodged in a chamber provided in the cover G', having a central bore to receive an actuating spring N, the projecting end of which bears against the wall of the cover G'. The end of the bolt is of convex form—see Fig. 3—to adapt it to enter a concave depression provided for its reception in the periphery of the bushing J. P is a key locking unit, of the pin type, set in the wall of the cover G', having a rocking pin P' extending into a recess m provided in the side of the bolt M for its reception. P$^2$ is a key controlling the operation of the lock.

Q denotes a vertically disposed bolt located adjacent to the bolt M and provided with a central bore to receive a spring R which also bears against the wall of the cover plate G'.

The abutting faces of the bolts M and Q are respectively formed with overlapping coacting inclined surfaces M$^a$ and Q$^a$ and are maintained in intimate coacting relation by the springs N and R.

Having now indicated the several parts by reference letters the construction and operation of the device will be readily understood.

To render the steering wheel A inoperative for purposes of actuating the steering post F', the lever L is manually rocked, thereby rotating upon the thimble H, the annular threaded bushing J, engaged with the thread G$^2$ of the cover plate G$^a$:—thus forcing the gear C out of mesh with the gears D, and lifting the steering wheel to the position indicated in Fig. 2 of the drawings. Upon being sufficiently elevated, the bolt M is forced through the action of its spring N toward the stub shaft and under the washer K;—the bolt being notched at m' to receive the washer and to extend under the latter,—thus serves to support the steering wheel in its free and inoperative relation to the steering post. Synchronous with the automatic projection of the bolt under the washer K, due to the action of the spring N, the bolt Q is forced downward into the gear case between the gears D through the action of the spring R thus preventing the removal of the cover plate G$^a$ by unauthorized persons attempting to unscrew it from the gear case G,—it being obvious that the bolt while extended between the gears of the case will prevent the rotation of the cover plate.

To restore the steering wheel to its operative relation with the steering post, a key P$^2$, is first inserted in the locking unit, and the pin P' rocked so as to force back the bolt M to the position indicated in Figs. 1 and 3 of the drawings:—the hand or steering wheel will then descend under its own weight, due to the high pitch of the threaded bushing J,—or the whole may be lowered by the manual operation of the lever L—the gear C will thus again enter into meshed relation with the gears D as indicated in Fig. 1:—the convex end m" of the bolt M projecting into the concave depression in the periphery of the threaded bushing, as clearly indicated in Fig. 3. The steering wheel is thus locked in operative relation to the steering post. It will also be apparent that as the bolt M, is forced backward under the action of the key that its inclined overlapping surface M$^a$, acting upon the corresponding inclined surface Q$^a$ of the bolt Q, will lift the spring actuated bolt Q out of the gear case, so that the gears may again function properly.

Having thus described my invention what I claim is:—

1. In a device of the character described, the combination of a steering post, a housing concentric to the post, a cover screwed to the housing, a steering wheel supported by a stub shaft adapted for lengthwise movement, planetary gearing inclosed in the housing for operatively connecting the steering wheel with the steering post, said stub shaft being movable upwardly and downwardly whereby the planetary gearing may be either operative or inoperative for connecting the steering wheel with the steering post, means for maintaining the stub shaft in an operative or inoperative relation to the steering post, and means carried by the cover of the gear housing, and automatically operated by the said means and arranged to engage with the gearing for preventing the removal of the cover while the steering wheel is in an operative disconnected relation to the steering post.

2. In a device of the character described, the combination of a steering post, a housing concentric to the post, a cover screwed to the housing, a steering wheel supported by a stub shaft adapted for lengthwise movement, planetary gearing inclosed in the housing for operatively connecting the steering wheel with the steering post, said stub shaft being movable upwardly and downwardly whereby the planetary gearing may be either operative or inoperative for connecting the steering wheel with the steering post, means for maintaining the stub shaft in an operative or inoperative relation to the steering post, and a spring actuated bolt supported in the cover and automatically operated by the said means and arranged to engage the gearing for preventing the removal of the cover while the steering wheel is in an inoperatively disconnected relation to the steering post.

3. In a device of the character described, the combination of a steering post fixed against lengthwise movement, a housing concentric to the post, a cover screwed to said housing, a steering wheel supported by a stub shaft adapted for lengthwise movement, planetary gearing inclosed in the housing for operably connecting the steering wheel with the steering post, a threaded sleeve concentric with the stub shaft and engaging the housing adapted to raise and lower the stub shaft, whereby the planetary gearing may be either operative or inoperative for connecting the steering wheel with the steering post, means for maintaining the stub shaft in an operative or inoperative relation to the steering post, and means adapted to be actuated upon the operation of said last named means to secure the cover of the housing against removal when the steering wheel is in an inoperative position with respect to the steering post.

4. In a device of the character described, the combination of a steering post fixed against lengthwise movement, a gear housing concentric to the post, a cover screwed to said housing, a steering wheel supported by a stub shaft adapted for lengthwise movement, planetary gearing inclosed in the housing for operably connecting the steering wheel with the steering post, an annular threaded sleeve engaging the cover of the housing mounted upon the stub shaft, means for manually rotating said sleeve, a key actuated bolt adapted to maintain the stub shaft in either an operative, or an inoperative relation to the steering post, and a coöperating spring actuated bolt supported in the cover of the gear housing, adapted upon the operation of the key actuated bolt to enter the housing between the gears, whereby the cover may be held against removal while the steering wheel is in an operatively disconnected relation to the steering post.

5. In a device of the character described, the combination of a steering post fixed against lengthwise movement, a gear housing concentric to the post, a cover screwed to said housing, a steering wheel supported by a stub shaft adapted for lengthwise movement, planetary gearing inclosed in the gear housing for connecting the stub shaft of the steering wheel with the steering post, an annular threaded sleeve concentric to the stub shaft and engaging the cover of the housing adapted for alternately shifting the stub shaft of the steering wheel from an operative to an inoperative relation with the steering post, a key operated spring actuated bolt adapted to support and maintain the stub shaft in either an operative or inoperative relation to the steering post, and a co-acting spring actuated bolt having an inclined face adapted to abut against a like inclined face on the key actuated bolt, whereby said bolt may be projected between the gears of the gear housing to secure the cover against removal upon the operation of the key actuated bolt.

6. In a device of the character described, the combination of a steering post fixed against lengthwise movement, a gear case concentric to the post, a cover screwed to said case, a steering wheel supported by a stub shaft adapted for lengthwise movement, planetary gearing inclosed in the gear case, for connecting the stub shaft of the steering wheel with the steering post, a thimble pinned to the stub shaft having a projecting flange, an annular threaded sleeve engaging the cover of the gear case mounted upon the thimble and recessed to receive the projecting flange of the latter to permit rotary movement of the sleeve on the thimble, an annular washer mounted on the stub shaft between the threaded sleeve and the planetary gearing, means for locking the steering wheel in an operative or inoperative relation to the steering post, and means for securing the cover of the gear case against removal upon the steering wheel being supported in an inoperative relation to the steering post.

In testimony whereof I sign this specification in the presence of two witnesses.

THEODORE D. STANLEY.

Witnesses:
S. E. THOMAS,
JNO. CONSIDINE, Jr.